US008160209B2

(12) United States Patent
Wang et al.

(10) Patent No.: US 8,160,209 B2
(45) Date of Patent: Apr. 17, 2012

(54) IVR CALL ROUTING TESTING

(75) Inventors: Fang Wang, Plano, TX (US); Peeyush Jaiswal, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1458 days.

(21) Appl. No.: 11/613,023

(22) Filed: Dec. 19, 2006

(65) Prior Publication Data

US 2008/0144786 A1 Jun. 19, 2008

(51) Int. Cl.
*H04M 1/24* (2006.01)

(52) U.S. Cl. ................ 379/26.02; 379/1.02; 379/10.02; 379/15.01

(58) Field of Classification Search ................ 379/1.01, 379/1.02, 10.01, 10.02, 10.03, 15.01, 22.02, 379/26.02, 68
See application file for complete search history.

(56) References Cited

U.S. PATENT DOCUMENTS 3,692,961 A 9/1972 Le Strat et al.
5,680,448 A 10/1997 Becker
6,141,410 A 10/2000 Ginzboorg
6,516,051 B2 2/2003 Sanders
6,788,934 B2 9/2004 Keenan et al.
6,823,054 B1 * 11/2004 Suhm et al. .................. 379/134
6,914,962 B2 * 7/2005 Neary ........................ 379/10.02
6,996,076 B1 2/2006 Forbes et al.
7,020,441 B2 3/2006 Adams et al.
7,539,287 B2 * 5/2009 Hunter et al. ............... 379/1.02
7,551,723 B2 * 6/2009 Mills et al. .................. 379/1.02

FOREIGN PATENT DOCUMENTS

WO WO 00/51016 8/2000

OTHER PUBLICATIONS

Turner, Analysing Interactive Voice Services, Computer Networks, 45, pp. 665-685, Mar. 2004.

* cited by examiner

*Primary Examiner* — Olisa Anwah
(74) *Attorney, Agent, or Firm* — Novak Druce + Quigg LLP

(57) ABSTRACT

A call routing test and verification system for an interactive voice response (IVR) system including an automated test driver (ATD) for connecting to a IVR system over a public switched telephone network (PSTN) configured to provide signals representative of content of utterances appropriate for responding to prompt signals of an IVR menu and a test module to enable a test mode of the IVR system in response to the connection by ATD, wherein the test mode allows the IVR system to transmit a call routing string to the ATD prior to transfer of the connection to one of a plurality of agent terminals in response to reaching a call routing point of the IVR menu, where the ATD is further configured to compare at least a portion of the transmitted call routing string to an expected routing string for the call routing point.

18 Claims, 2 Drawing Sheets

100

IVR CALL ROUTING TESTING

FIELD OF THE INVENTION

The present invention is related to the field of call routing testing systems and methods, and more particularly, to systems and methods for testing and verification of interactive voice response (IVR) call routing systems.

BACKGROUND OF THE INVENTION

Many businesses now route customer calls by using an automated telephone system. Many of these systems are presently implemented using an interactive voice response (IVR) system which can generate computer-provided pre-recorded, synthesized or re-constituted "voice" messages to guide a caller in entering information via telephone keypad activation, by voice input, or both, in order to connect the customer to an appropriate system or operator. For example, after initiating a call to a banking IVR system, the caller may hear an audio message requesting entry of the caller's account number, followed by a further series of inquiries to connect the caller to the correct account system or to a customer service agent who can address the caller's issue.

A problem separate and apart from the technical implementation of such systems is the need to provide verification of accuracy of operation on an initial and continuing basis, particularly after program modification. Verifying operation of the IVR system during the course of a single call to an IVR system is relatively straightforward when performed manually. However, verifying operation of a complicated IVR system is correspondingly complex and cumbersome to perform on a manual basis.

One solution to enable operators of IVR systems to verify accuracy of performance has been to automatically test call flow during an IVR system interaction. In general, such testing is limited to automatically testing the prompting system of a complex IVR system by using a number of scripts to reach a target option. However, such systems generally only test menu flow and provide no testing of actual call routing. Call routing is generally tested by verification of operation of the switchboard of a telephony network, locally or remote. However, testing of the call routing functionality must generally be performed separately from testing of the IVR systems, as the call routing system or telephony switchboard typically operates independent from the IVR system.

Therefore, systems and methods are needed that enable operators of IVR systems to test and verify the performance of the call routing systems associated with an IVR system.

SUMMARY OF THE INVENTION

The present invention provides for systems and methods for testing and verifying correct call routing in response to navigation through an interactive voice response (IVR) system. The present invention utilizes a remote automated test driver (ATD) connecting to the IVR system having a test application or module. The ATD can interact with the IVR system accordingly, where the test module can configure the IVR system to provide additional signals, indicative of intended or actual call routing, which can be used by the ATD to confirm correct call routing.

One embodiment of the invention is system including an automated test driver (ATD) for connecting to an IVR system over a public switched telephone network (PSTN) configured to provide signals appropriate for responding to prompt signals of an IVR menu of the IVR system and a test module of the IVR system to enable a test mode of the IVR system in response to the connection by ATD. The test mode allows the IVR system to transmit a call routing string to the ATD prior to transferring the connection to an agent terminal in response to reaching a call routing point of the UVR menu and the ATD can be configured to compare a portion of the call routing string to an expected routing string for the call routing point.

Another embodiment of the invention is a method for automatically confirming correct call routing of an interactive voice response (IVR) system including: initiating a connection over a public switched telephone network (PSTN) to the IVR system, placing the IVR system in a test mode, responding to prompts of an IVR menu of the IVR system to reach a call routing point, transferring a call routing string associated with the calling routing point over the PSTN connection, and comparing at least a portion of the transferred call routing string to an expected routing string for the routing point.

In yet another embodiment of the invention, A computer-readable storage, having stored thereon a computer program having a plurality of code sections executable by a computer can be provided, the code causing the machine to perform the following steps: initiate a connection over a public switched telephone network (PSTN) to an interactive voice response (IVR) system; place the IVR system in a test mode, respond to prompts of an IVR menu of the IVR system to reach a call routing point; transfer a call routing string associated with the calling routing point over the PSTN connection; and compare at least a portion of the transferred call routing string to an expected routing string for the routing point.

In some embodiments the transferred routing string can comprise a dual-tone multi-frequency (DTMF) sequence. In other embodiments, at least a portion of the call routing string can include profile information.

In some embodiments, the connection to the IVR can be transferred to one of a plurality of agent terminals according to the call routing string. In other embodiments, once connected to an agent terminal, an identification routing string associated with an agent terminal can be transmitted over the PSTN connection and can be compared to an expected routing string. In some embodiments, at least a portion of the identification routing string can comprise profile information.

In other embodiments, a computer telephony interface (CTI) can be used to provide access to one or more agent terminals. In alternative embodiments a connection over a data network to the CTI can be used to disable connection transfers to at least some selected agent terminals. In some embodiments, the selection of agent terminals to disable connection transfers can be based on the profile.

Other embodiments, when configured in accordance with the inventive arrangements disclosed herein, can include other methods or computer-readable storage medium having computer code for performing the various procedures and processes disclosed herein.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE DRAWINGS

With reference now to the various figures, in which like elements are identically numbered throughout, a description of the various embodiments of the present invention will now be provided. While the invention is disclosed in the context of a single arrangement, it can be appreciated that the invention can include numerous modifications from the embodiments described herein.

Figure 1:
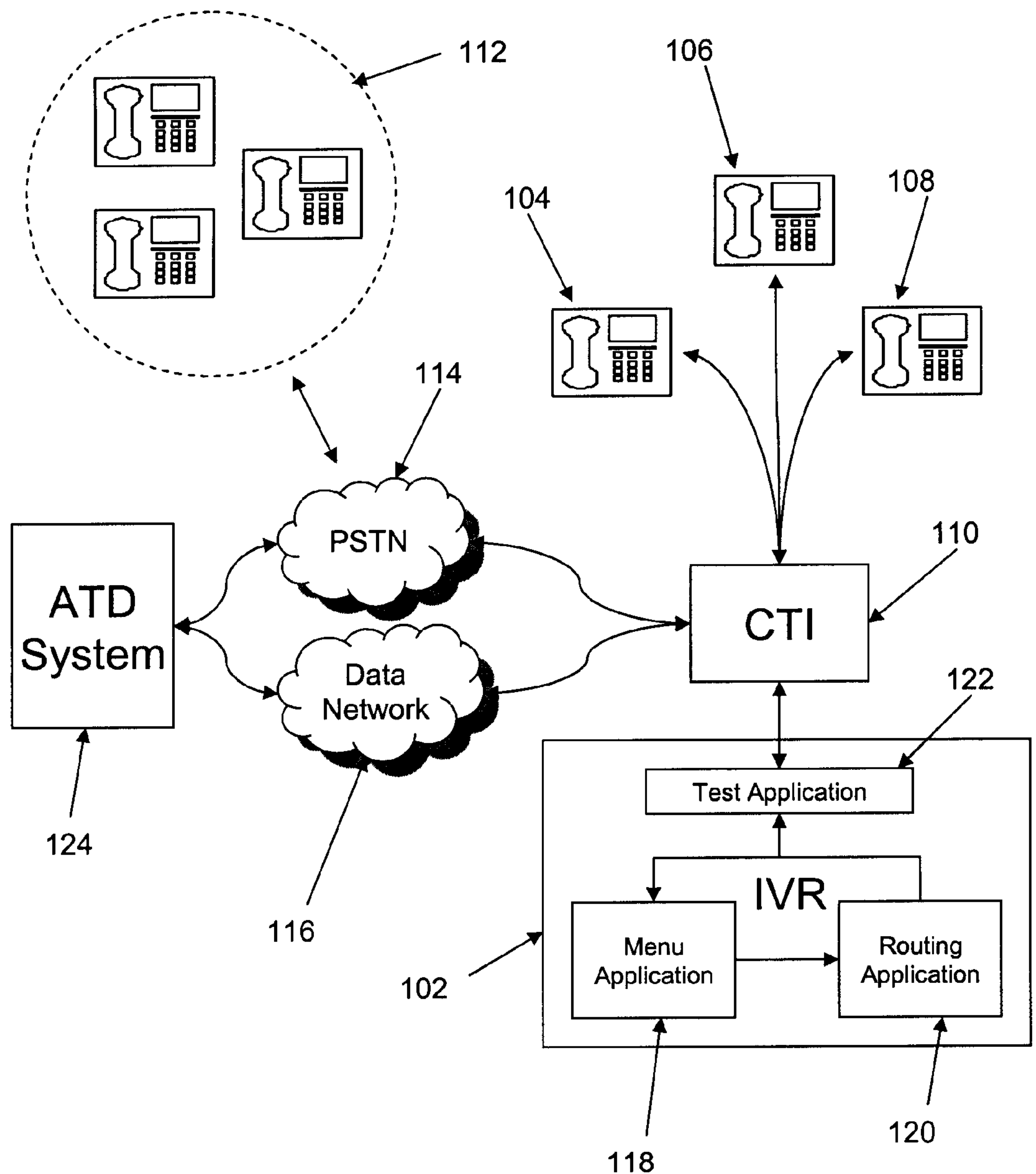
FIG. 1 depicts an exemplary arrangement of a system for confirming call routing for an interactive voice response (IVR) system.

FIG. 1 depicts an exemplary arrangement of an interactive voice response system (IVR) suitable for confirming correct call routing 100. The system 100 can comprise at least one IVR system 102 and a plurality of agent terminals 104, 106, 108 coupled to a computer telephony interface (CTI) system 110 for routing incoming calls from one or more callers 112 over a public switched telephone network (PSTN) 114 to the at least one IVR system 102 or to at least one of the plurality of agent terminals 104, 106, 108. However, the CTI system 110 is not limited in this regard and may be accessible via a private telephone network, a direct connection, or a data communications network 116. Furthermore, although the CTI system 110 is shown as a single computing system, the CTI system 110 can be implemented as centralized or a decentralized computing device.

The IVR system 102 can comprise an IVR menu module 118, a routing module 120, and a testing module 122. The menu module 118 can be used to generate the audio prompts for navigating the IVR system and to interpret inputted voice and dual tone multi-frequency (DTMF) signals representing caller speech and telephone keypad actuations. The menu module 118 can also be used to determine when a call routing point of the IVR menu structure has been reached and to transfer control of the call to a routing module 120. The routing module 120 can be configured to determine the appropriate routing number according to calling routing point of the IVR menu structure and to instruct the CTI system 110 to transfer the incoming call from the IVR system 102 to at least one of the plurality of agent terminals 104, 106, 108. When activated, the testing module 122, described more particularly below, can be configured to monitor for instances in which the menu module 118 transfers control to the routing module 120 and can instruct the IVR module to provide additional signals and prompts during a IVR system test. Although shown as single computing system, each of the modules of an IVR system 102 alternatively can be represented as a centralized or a decentralized computing device.

Additionally, an automated test driver (ATD) system 124 can be provided. The ATD system 124 can be configured to automatically place calls over the PSTN 112 to connect to the IVR system 102 during an IVR system test. The ATD system 124 can be configured to simulate incoming calls from the one or more callers 108, including voice and dual tone multi-frequency (DTMF) signals representing caller speech and telephone keypad actuations. The ATD system can also be configured to access the CTI system 110 over a data communications network. The ATD system 124 and the IVR system 102 can utilize centralized or decentralized common computing technologies (e.g., desktop computers, servers, mainframes, etc.). Moreover, one or more of the components of the IVR system 102 can be combined into a single or multiple computing devices. Accordingly, the elements illustrated of FIG. 1 can be considered logical representations for the purposes of the present disclosure.

Figure 2:
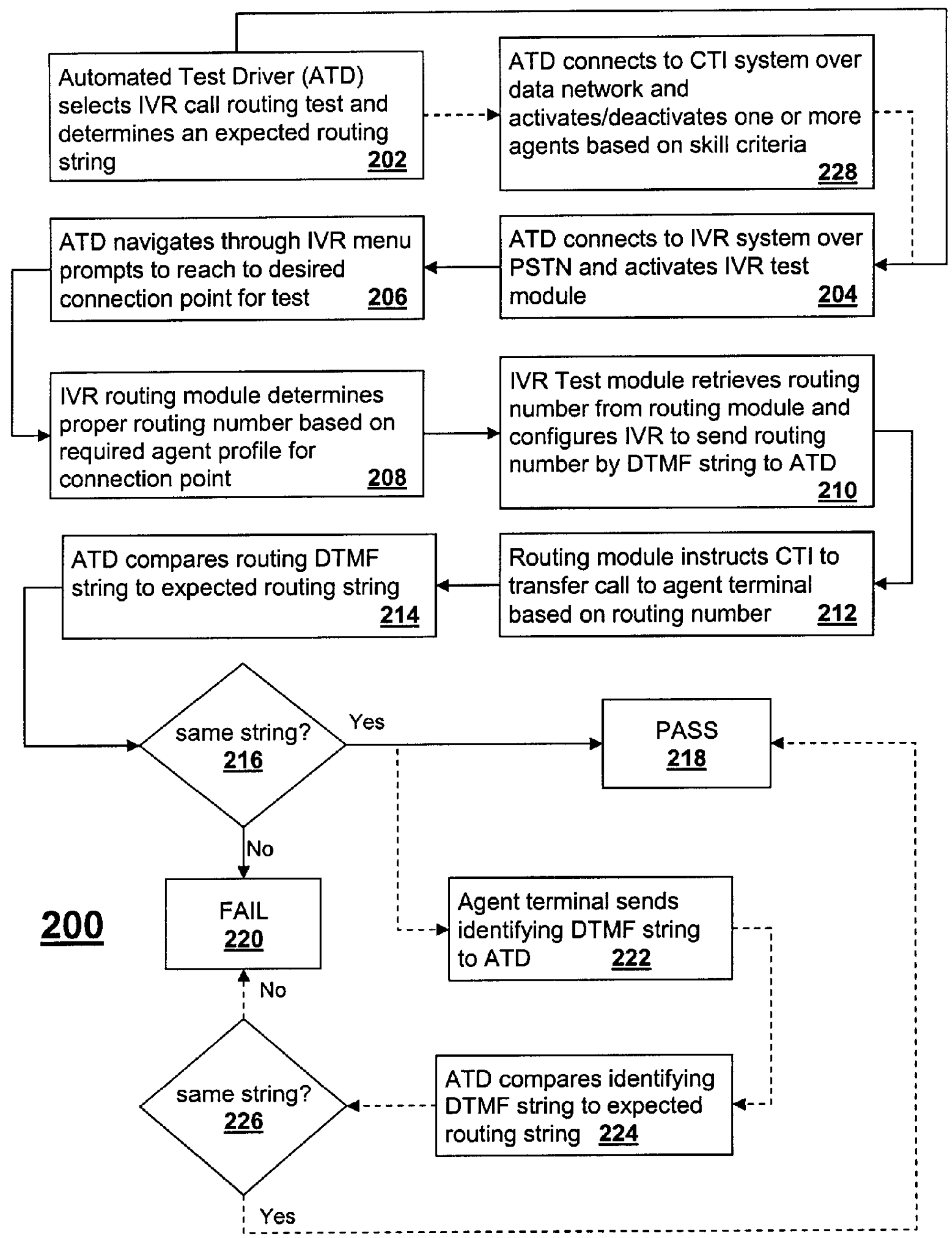
FIG. 2 depicts an exemplary method operating in the system.

FIG. 2 depicts an exemplary method 200 operating in portions of the system 100. Method 200 begins with step 202 in which an ATD system 124 selects a call routing test for the IVR system 102. A call routing test in the method 200 can comprise a series of preprogrammed responses for the prompts of the IVR menu module 118, resulting in an expected call routing. However, the call routing test need not be pre-programmed and ATD system 124 can be configured to provide responses randomly and the ATD system 124 can determine an expected call routing upon reaching a call routing point of the IVR menu structure.

The ATD system 124 can then place a call over the PSTN 114 in order to connect to the IVR system 102 and place the IVR system in a test mode, step 204. In the illustrated example, the ATD system 124 connects to the IVR system 102 through the CTI system 110. However, the CTI system 110 or at least its functionality could be incorporated into the IVR system 102 and the ATD system 124 could connect directly to the IVR system 102. Once connected to the ATD system, the IVR system 102 can be placed in a test mode upon a first pre-programmed entry transmitted to the IVR system 102 over the PSTN 114 by the ATD system 124. However, the IVR system 102 can also be configured to automatically detect an incoming call from an ATD system 124 and automatically place the IVR system 102 in a test mode. Additionally, the ATD system 124 can be configured to place the IVR system 102 in a test mode prior to the call being connected via a communication over a data network 116 or other direct connection.

In the illustrated example, placing the IVR system 102 in a test mode can comprise activation of a test module 122. The test module 122 can be configured to activate additional functionality of the menu module 118 or the routing module 120 normally not available during a normal caller interaction with the IVR system 102. Alternatively, a test mode of the IVR system 102 can comprise activation of a test module 122 to monitor the interaction between the menu module 118 and the routing module 120 and intervene whenever additional tasks for the test mode need to be performed.

Once the ATD system 124 is connected to the IVR system 102, the ATD system 124 can navigate through the prompts of the IVR menu module 118 to reach a call routing point of the IVR menu structure, step 206. The prompts of the IVR menu module 118 can comprise one or more signals representing audio instructions to the caller, including, but not limited to, pre-recorded, synthesized, or reconstituted voice messages. The ATD system 124 can be configured, as previously discussed, to enter a preprogrammed response to the audio prompts. Alternatively, the ATD system 124 may be configured to include a speech recognition module to interpret the audio prompts and provide an appropriate response based on the prompts provided by the menu module 118. The ATD system 124 can also use the speech recognition module to determine if the preprogrammed response is appropriate for the prompt provided by the menu module 118. The ATD system 124, as previously discussed can provide responses to the IVR menu module 118 prompts using voice responses, DTMF responses, or a combination of both.

Once the appropriate series of responses are provided by the ATD system 124, a call routing point is reached in the IVR menu structure. The call routing point can be forwarded to the IVR routing module 120, which can determine where to transfer the call from the IVR system 102 and can determine the appropriate instructions to the CTI system 110 for transferring the call at step 208. In the illustrated example, the call can be transferred to at least one of the agent terminals 104, 106, 108 having criteria matching an agent terminal profile for the call routing point. An agent terminal profile can include various types of agent terminal information, including, but not limited to, phone number information, location information, or skill information, such as language or expertise.

The routing module can also be configured to determine that it is appropriate to signal the CTI system 110 to transfer the call to a second UVR system. In some embodiments, a plurality of IVR systems may be navigated prior to reaching a call routing point resulting in transferring a call to at least one of the plurality of agent terminals 104, 106, 108.

The one of the plurality of agent terminals 104, 106, 108 to which the call is transferred to can be dependent on the call routing point reached in the IVR menu structure. For example, an agent terminal profile may be associated with certain types of transactions or with certain call routing points of the IVR menu structure. For example, where the routing module 120 associates a call routing point with a first agent terminal 104 and that call routing point is reached, the CTI system 110 may receive an instruction to transfer the call only to the first agent terminal 104. Alternatively, the routing module can associate a call routing point with several agent terminals or only a specified group of agent terminals. For example, only a second and third terminal, 106, 108 may be associated with a specific type of transaction, such that when that call routing point associated with that type of transaction is reached, the CTI system 110 can receive instructions to transfer the call only to the second or third agent terminals. Additionally, the routing module can include a preference in the instructions to the CTI system 110 for routing calls to multiple agent terminals. For example, even if several agent terminals can be associated with a call routing point, a preferred order of contact may exist for the plurality of agent terminals 104, 106, 108 and the routing module 120 can instruct the CTI system 110 to attempt a transfer to a first or second agent terminals 104, 106 before transferring to a third agent terminal 108.

In most IVR systems, once the correct instructions for the CTI system 110 are determined, the instructions are forwarded to the CTI system 110 which forwards the call appropriately. In the present invention, once the test module 122 is activated, an additional step is required. Prior to transferring the call, the IVR test module 122 can be configured to retrieve the instructions for the CTI system 110 from the routing module 120 and configure the menu module 118 to forward them to the ATD system 124, at step 210. Subsequently, the call can be transferred by the CTI system 110 according to the instructions provided by the routing module 120, at step 212.

In some embodiments, the instructions can be forwarded to the ATD system 124 as a voice response. In other embodiments, the instructions for the CTI system 110 can be converted into a DTMF call routing string, which is forwarded to the ATD system 124 over the PSTN 114 connection. In some embodiments, the test module 122 can convert at least a portion of the instructions designating the target agent terminal or target group of agent terminals to DTMF. The test module can then configure the IVR menu module 118 to forward the DTMF string to the ATD system 124. In other embodiments, the test module 122 may only provide instructions to the menu module 118 to retrieve the instructions for CTI system 110 from the routing module 120 directly and automatically convert the string to DTMF prior to forwarding the string to the ATD system 124.

Use of the DTMF signal allows data to be transferred quickly and accurately using only the PSTN connection to the ATD system 124, without the need for any other type of network connection. Additionally, by using a standard connection over the PSTN 114, it is possible to use the ATD system 124 without having to shutdown the IVR system 102 or the CTI system 110. In such embodiments, the test module 122 can be activated on a call-by-call basis, allowing the ATD system 124 to test the IVR system 102 without requiring the entire IVR system 102, the CTI system 110, or the plurality of agent terminals 104, 106, 108 to be placed in a special operating mode.

Once the ATD system 124 receives the DTMF string, the ATD system 124 can compare the received call routing string to the expected routing string for the call routing point, at step 214. If the strings match, at step 216, then the ATD system 124 can be configured to report that the test was successful and that the routing has been performed correctly, at step 218. However, if the strings do not match, step 216, then the test is deemed a failure, at step 220. When a failure occurs, a problem with routing can be reported by the ATD system 124, and the operator of the IVR system 102 can take appropriate action.

In some embodiments, the system 100 can be further configured to verify that not only were correct routing instructions forwarded to the CTI system 110, but also that the actual routing of the call was performed correctly. In such embodiments, even if the call routing string matches the expected string, the ATD system 124 can also verify that the operator or system receiving the call is one designated by the call routing string and the expected string. In these embodiments, each of the agent terminals 104, 106, 108 can also be configured to send an identification routing string to the ATD system, step 222. In at least some embodiments, the identification routing string forwarded to the ADT system 124 can also comprise a DTMF string.

Similar to the IVR system 102, a test module for the CTI system 110 or for each of the agent terminals can be provided to retrieve and forward the identification string from the connected agent terminal. Alternatively, the identification string can be retrieved only from the CTI system 110, where the string can be based on the actual connection the CTI system 110 makes to an agent terminal or other IVR system. Additionally, similar to the interaction with the IVR system 102, the ATD system 124 can compare the received signal to the expected string, at step 224. If the strings match, at step 226, then the ATD system 124 can be configured to report that the test was deemed successful and that the routing has been performed correctly, at step 218. However, if the strings do not match, at step 226, then the test is deemed a failure, at step 220, and a problem with routing can be reported by the ATD system 124 so that the operator of the IVR system can take appropriate action.

Among the various embodiments of the invention, a call routing string can be constructed in several ways. In some embodiments, the call routing string can be specifically configured to include at least a portion which can identify the specific agent terminal or system to which the call is to be routed to. In other embodiments, the call routing string can be configured to include at least a portion that provides profile or description information of the type of agent terminal or system to which the call is to be routed to. In still other embodiments, the call routing string can be a combination of portions, providing portions containing both descriptive and identifying information for the agent terminal to be connected to. The expected call routing string and the identification routing string can be similarly constructed.

In the various embodiments, matching received call routing strings to expected routing strings can be accomplished in several ways. In some embodiments, the ATD system 124 can be configured to maintain a database of expected call routing strings associated with each call routing point. Upon receipt of a call routing string, the ATD system 124 can then lookup the call routing point in the database and determine whether the call routing string matches any of the entries associated with the call routing point. In other embodiments, the ATD system 124 can be configured to perform pattern matching or pattern recognition on the received string to look for patterns which are associated with the call routing point. For example, the ATD system 124 can be configured to search for a phone number prefix or other phone number portion of the agent terminals known to be associated with the call routing point. In another embodiment, the ATD system 124 can be configured to search the forwarded string for a pattern or sequence associated with a specific agent terminal profile or descriptive information required for the call routing point, such as expertise level or language.

In yet other embodiments, the expected routing string can include variable portions, in which multiple entries for a field are acceptable. In other embodiments, a combination of methods can be used. Similarly, the identification string can be compared to the expected string. However, in some embodiments, different methods can be used to compare the call routing string and the identification string. For example, matching of the call routing string can be based only on searching the call routing string for pattern associated with an agent terminal profile associated with the call routing point. However, matching of the subsequently received identification routing string can be based instead on a lookup of whether the specific agent terminal to which the call is connected is appropriate for the call routing point or the agent terminal profile.

In embodiments where several levels of agent terminals are provided or where preferred agent terminals are provided, the system 100 can also be configured to allow for additional testing of call routing to an appropriate level or preferred agent terminals. In some embodiments, prior to connecting over the PSTN 114, the ATD system 124 can be configured to connect to the CTI system 110 over a data communications network 116 in order to disconnect or deactivate one or more agent terminals 104, 106, 108 based on one or more criteria, step 228, to test such routing.

For example, in system 100, if a first and second terminal 104, 106 can be associated with agents having a lower level of expertise than an agent associated a third terminal 108, the IVR operator may wish to determine that calls will be forwarded to the third terminal 108 only when the first and second terminals 104, 106 are unavailable. Therefore, prior to connecting over the PSTN 114 to the CTI system 110, the ATD system 124 can connect over a data communications network 116 and deactivate the first and second terminals 104, 106. Subsequently, once the ATD system 124 connects over the PSTN 114 to the IVR system 102, the routing system 120 can determine that a call routing point can be forwarded to any of the terminals 104, 106, 108. Upon being connected to the only available terminal, the third terminal 108, the identifying string for the connected terminal will be forwarded to the ATD system 124. Subsequently, the test will be deemed successful only if the identifying string forwarded to the ATD system 124 comprises the third terminal 108 identifying information. Such embodiments allow progressive testing of call routing where there are multiple levels of agent terminals and the IVR operator wishes to test preferential forwarding, by allowing the operator to deactivate one or more levels of response to verify correct routing of calls.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed:

1. An automatic call routing test and verification system for an interactive voice response (IVR) system, comprising:

an automated test driver (ATD) for connecting to said IVR system over a public switched telephone network (PSTN), said ATD configured to provide signals representative of content of utterances appropriate for responding to prompt signals of an IVR menu of said IVR system; and a test module of said IVR system to enable a test mode of said IVR system in response to said connection by ATD, wherein said test mode allows said IVR system to transmit a call routing string to said ATD prior to transfer of said connection to one of a plurality of agent terminals in response to reaching a call routing point of said IVR menu, wherein said ATD is further configured to compare at least a portion of said transmitted call routing string to an expected routing string for said call routing point.

2. The system of claim 1, wherein said transmitted call routing string comprises a dual-tone multi-frequency (DTMF) sequence.

3. The system of claim 1, wherein at least a portion of said call routing string comprises profile information.

4. The system of claim 1, wherein said ATD is further configured to receive an identification routing string associated with one of said plurality of agent terminals and to compare at least a portion of said identification routing string to said expected routing string.

5. The method of claim 4, wherein said received identification routing string comprises a dual-tone multi-frequency (DTMF) sequence.

6. The method of claim 4, wherein at least a portion of said identification routing string comprises profile information.

7. The method of claim 6, wherein a computer telephony interface (CTI) provides access to said plurality of agent terminals, wherein said ATD is further configured to connect over a data network to said CTI and disable selected ones of said plurality of agent terminals.

8. A method for automatically testing and verifying correct call routing of an interactive voice response (1VR) system, the method comprising:

initiating a connection over a public switched telephone network (PSTN) to said IVR system;

placing said IVR system in a test mode;

responding to prompts of an IVR menu of said IVR system to reach a call routing point;

transferring a call routing string associated with said calling routing point over said PSTN connection;

comparing at least a portion of said transferred call routing string to an expected routing string for said routing point; and transferring said connection to said IVR to one of a plurality of agent terminals according to said call routing string.

9. The method of claim 8, wherein said received transferred routing string comprises a dual-tone multi-frequency (DTMF) sequence.

10. The method of claim 8, wherein at least a portion of said call routing string comprises profile information.

11. The method of claim 8, further comprising the steps of:

receiving an identification routing string associated with said one of agent terminals; and comparing at least a portion of said identification routing string to said expected routing string.

12. The method of claim 8, wherein at least a portion of said identification routing string comprises profile information.

13. There method of claim 12, wherein a computer telephony interface (CTI) provides access to said plurality of agent terminals, and further comprising the step of:

prior to initiating said connection, connecting over a data network to said CTI and disabling connection transfers to selected ones of said plurality of agent terminals.

14. The method of claim 13, wherein said selected ones of said plurality of agent terminals are selected according to said profile.

15. A non-transitory computer-readable storage, having stored thereon a computer program having a plurality of code sections executable by a machine for causing the machine to perform the steps of:

initiating a connection over a public switched telephone network (PSTN) to an interactive voice response (IVR) system;

placing said IVR system in a test mode;

responding to prompts of an IVR menu of said IVR system to reach a call routing point;

transferring a call routing string associated with said calling routing point over said PSTN connection;

comparing at least a portion of said transferred call routing string to an expected routing string for said routing point; and transferring said connection to said IVR to one of a plurality of agent terminals according to said call routing string.

16. The non-transitory computer-readable storage of claim 15, the step of transferring further comprising:

converting said call routing string into dual-tone multi-frequency (DTMF) sequence.

17. The non-transitory computer-readable storage of claim 15, further comprising the steps of:

transferring an identification routing string associated with said one of agent terminals; and comparing at least a portion of said identification routing string to said expected routing string.

18. The non-transitory computer-readable storage of claim 15, wherein a computer telephony interface (CTI) provides access to said plurality of agent terminals, and further comprising the step of:

prior to initiating said connection, connecting over a data network to said CTI and disabling connection transfers to selected ones of said plurality of agent terminals.

* * * * *